(12) United States Patent
VanderKnyff (10) Patent No.: US 10,402,373 B1
(45) Date of Patent: Sep. 3, 2019

(54) FILESYSTEM REDIRECTION

(71) Applicant: Amazon Technologies, Inc., Seattle, WA (US)

(72) Inventor: Christopher Michael VanderKnyff, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 561 days.

(21) Appl. No.: 15/018,718

(22) Filed: Feb. 8, 2016

(51) Int. Cl.
| G06F 7/00 | (2006.01) |
| G06F 17/00 | (2019.01) |
| G06F 16/172 | (2019.01) |
| G06F 9/455 | (2018.01) |
| G06F 16/182 | (2019.01) |
| G06F 16/188 | (2019.01) |
| G06F 16/23 | (2019.01) |

(52) U.S. Cl.
CPC ........ G06F 16/172 (2019.01); G06F 9/45533 (2013.01); G06F 16/182 (2019.01); G06F 16/188 (2019.01); G06F 16/2365 (2019.01)

(58) Field of Classification Search
None
See application file for complete search history.

(56) References Cited

U.S. PATENT DOCUMENTS

| 2005/0138176 A1* | 6/2005 | Singh | H04L 29/06 709/226 |
| 2009/0204705 A1* | 8/2009 | Marinov | G06F 17/30203 709/224 |
| 2013/0117240 A1* | 5/2013 | Taylor | G06F 17/30194 707/690 |
| 2013/0219005 A1* | 8/2013 | Kotecha | H04W 4/18 709/212 |
| 2015/0089577 A1* | 3/2015 | Beckman | H04L 63/105 726/1 |
| 2015/0120821 A1* | 4/2015 | Bendell | H04L 67/02 709/203 |
| 2015/0248887 A1* | 9/2015 | Wlodkowski | G10L 17/22 704/246 |

* cited by examiner

Primary Examiner — Tuan A Pham
(74) Attorney, Agent, or Firm — Knobbe, Martens, Olson & Bear, LLP (57) ABSTRACT

Systems and methods are described for providing a proxied filesystem in a hosted computing environment. A provider of hosted computing services provides a filesystem proxy server. The server proxies filesystems on a client computing device utilizing the hosted computing environment, enabling the resources of the hosted computing environment to access the filesystems of the client computing device. Requests for resources in the proxied filesystem may be cached, and updates to cached resources may be communicated as a set of changes that, when applied to the cached resource, transform it into the current version of the resource. The filesystem proxy server may proxy read requests, write requests, requests for information pertaining to the filesystem, and may be implemented within a virtual machine in the hosted computing environment or as a standalone service.

21 Claims, 8 Drawing Sheets

FILESYSTEM REDIRECTION

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to clients.

To facilitate increased utilization of data center resources, virtualization technologies may allow a single physical computing device, or a configuration of networked physical computing devices, to host one or more instances of virtual machines that appear and operate as independent computing machines to a connected computer user. With virtualization, the single physical computing device can create, maintain, or delete virtual machines in a dynamic manner. In turn, users can request computing resources (e.g., a virtual machine configured to appear and operate as a personal computer) from the data center, and be provided with virtual machine instances that provide the requested resources.

A virtual machine hosted in a data center may have access to computing resources hosted at the data center, such as networked storage volumes, processors, and the like. A remotely hosted virtual machine may have access to resources outside the data center via network interfaces, which may introduce latency and bandwidth issues as the virtual machine attempts to access the external resources.

BRIEF DESCRIPTION OF THE DRAWINGS

The foregoing aspects and many of the attendant advantages will become more readily appreciated by reference to the following detailed description, when taken in conjunction with the accompanying drawings, wherein.

DETAILED DESCRIPTION

Generally described, aspects of the present disclosure are directed to processing data requests in a data center providing virtual computing services. More specifically, aspects of the present disclosure are directed to systems, methods, and computer-readable media related to providing a proxied filesystem to a virtual computing environment. Illustratively, a proxied filesystem may represent a filesystem on a client computing device or other computing device hosted outside the data center. Files and other data corresponding to the external filesystem may be stored in a local cache of a proxy, such that I/O requests for the filesystem may be fulfilled with the cached information and without retrieving files or data from the external filesystem.

In accordance with the present disclosure, a data center may instantiate one or more virtual machines. Illustratively, the data center may instantiate a virtual machine in response to a request from a client computing device, which may specify parameters such as operating systems, processing power, memory capacity, storage volumes, and the like. The user may illustratively interact with the instantiated virtual machine via a network connection between the data center and the client computing device, or in some embodiments may configure the virtual machine for standalone operation.

The client computing device may illustratively contain a number of client storage volumes, which in turn may be configured with one or more filesystems. For example, a physical storage volume may be connected to the client computing device, and may be partitioned into a number of logical storage volumes each having its own separate filesystem. As further examples, the client computing device may have access to removable storage volumes, such as a Universal Serial Bus (USB) flash drive, or may have access to Network Attached Storage (NAS) volumes via Ethernet, Wi-Fi, or other network interfaces. Illustratively, the client computing device may have lower latency and higher bandwidth than the virtual machine when accessing the local storage volumes.

In an aspect of the present disclosure, a filesystem proxy server may provide a proxied filesystem corresponding to a filesystem on a client storage volume. Illustratively, the filesystem proxy server may be implemented via various hardware and software components within the data center. For example, in some embodiments, the filesystem proxy server may be implemented as a software process executing within the virtual machine on a host computing device. In further embodiments, the filesystem proxy server may be a separate software process executing on the same host computing device, on a different computing device, or may be a separate hardware component within the data center that the virtual machine accesses via a physical or virtual network interface.

In some embodiments, the filesystem proxy server may provide an interface enabling the virtual machine to access the proxied filesystem. For example, the filesystem proxy server may provide an interface utilizing the Hypertext Transfer Protocol (HTTP), the File Transfer Protocol (FTP), the Server Message Block (SMB) protocol, or other protocols to facilitate access to the proxied filesystem from the virtual machine. The filesystem proxy server may further implement extensions such as the Web Distributed Authoring and Versioning (WebDAV) extension to HTTP or Portable Operating System Interface (POSIX) extensions to SMB. One skilled in the art will appreciate that the examples provided herein are illustrative rather than limiting, and that aspects of the present disclosure include any suitable interface or protocol.

Illustratively, the filesystem proxy server may communicate with the client computing device via a network to facilitate access to a client filesystem. The filesystem proxy server may, for example, communicate with a client filesystem application executing on the client computing device. The filesystem proxy server may transmit requests to the client filesystem application, such as requests for information regarding client filesystems, requests for files stored in the client filesystem, requests for file versions or timestamps, or requests to transmit any changes or updates to files stored in the client filesystem. Further, in some embodiments, the client filesystem application may monitor the client filesystem, and may transmit changes or updates to files stored in the client filesystem independently of requests from the filesystem proxy server. The filesystem proxy server and the client filesystem application may exchange information via a standard protocol or interface, or may communicate via a private protocol or interface.

In various aspects of the present disclosure, the filesystem proxy server may request or receive from the client filesystem application information regarding client filesystems. The information may illustratively include a complete list of filesystems on the client computing device, a list of filesystems that the user has indicated the virtual machine is permitted to access, or a particular filesystem that the client has requested or that the virtual machine has requested. Illustratively, a request to proxy a particular filesystem on the virtual machine may be issued directly by the user, either from the client computing device or via the virtual machine, or the request may be generated by an application executing on the virtual machine or the client computing device on behalf of the user.

The filesystem proxy server may provide a proxied filesystem to the virtual machine. Illustratively, the filesystem proxy server may present the client filesystem to the virtual machine as a networked drive accessible through a WebDAV server, a filesystem accessible via the SMB protocol, an FTP repository, or through any other service or protocol that presents the client filesystem to the virtual machine in a compatible manner. The filesystem proxy server may, for example, interact with an operating system executing on the virtual machine to provide an interface to the proxied filesystem. In some embodiments, the filesystem proxy server may present an interface to the virtual machine prior to obtaining filesystem information from the client computing device. For example, the filesystem proxy server may present an interface indicating that client filesystems may be available to be proxied, and may process a request from the virtual machine before obtaining available client filesystems.

In certain embodiments, the filesystem proxy server may defer obtaining files or information from the client filesystem until a request is received from the virtual machine. For example, the filesystem proxy server may defer obtaining a directory listing of files stored in the client filesystem until the user requests a directory listing. As a further example, the filesystem proxy server may defer obtaining a file from the client filesystem until the virtual machine attempts to access to the file. The filesystem proxy server may illustratively obtain files or filesystem information via the client filesystem application, which processes requests from the filesystem proxy server.

Additionally, upon receiving a request, the filesystem proxy server may initially determine whether it can fulfill the request with resources that are locally cached at the filesystem proxy server rather than obtaining resources from the client filesystem. For example, the filesystem proxy server may obtain a file from the client filesystem, and may cache the obtained file in a local cache. Subsequent requests for the same file may then be satisfied by providing the locally cached version of the file. In some embodiments, the filesystem proxy server may assign a timestamp, version number, checksum, hash value, or other identifier to a resource cached in the local cache, and may verify that the locally cached resource is still current by confirming with the client filesystem application that the corresponding identifier for the resource in the client filesystem is unchanged.

If the filesystem proxy server determines that a resource in the client filesystem has changed since it was locally cached, the filesystem proxy server may obtain the set of changes to the resource. Illustratively, the filesystem proxy server may obtain the output of a binary 'diff' command, a calculation of the Levenshtein distance between the current and cached resources, or other utility that compares the updated client filesystem resource to the version in the local cache. The obtained set of changes may be in the form of a series of edit operations, such a series of insertions, deletions, and substitutions that, if applied to the cached version of the resource, will produce the current version of the resource. In some embodiments, the client filesystem application may instead determine that the client filesystem resource has changed, and may transmit a set of changes to the filesystem proxy server independently of a request from the server. Further, in some embodiments, the client filesystem application may determine that sending the entire resource is more efficient than calculating the edit distance. For example, the client filesystem application may determine that a binary 'diff' command has been executing for more than a threshold duration, and may terminate execution of the 'diff' and instead transmit the current version of the resource.

The filesystem proxy server and the client filesystem application may communicate via an open protocol, a proprietary protocol, or a combination of both. For example, the filesystem proxy server and client filesystem application may transfer full copies of files via an open protocol, and may use a proprietary protocol to communicate changes to files.

The filesystem proxy server may further receive and process changes to the proxied filesystem, such as a write request from the user of the virtual machine. Illustratively, the filesystem proxy server may determine whether a write request modifies a locally cached resource, and if so may determine the set of changes required to update the locally cached resource, and then transmit the set of changes to the client filesystem application. The client filesystem application may in turn apply the set of changes to the client version of the resource. For some requests, such as deleting a file, the filesystem proxy server may transmit the request itself to the client filesystem application rather than determining and transmitting a set of changes. Further, in some embodiments, the filesystem proxy server may determine that sending the updated resource is more efficient than calculating the edit distance. The filesystem proxy server may further apply the requested change to the local cache to maintain a current copy of the resource locally.

Though described herein with respect to filesystems of a client computing device, embodiments of the present disclosure may be applied to requests to provide access to any networked service or resource external to the data center, including but not limited to Web content, databases, applications, and other external resources. Moreover, though illustrative examples are provided herein with regard to proxying resources to virtual machines, aspects of the present disclosure may be applied to any physical or virtual computing device and should not be construed as limited to virtual machines. For example, in some embodiments, a filesystem proxy server may provide a proxied filesystem to a physical computing device in accordance with aspects of the present disclosure.

The foregoing aspects and many of the attendant advantages will become more readily appreciated as the same become better understood by reference to the following description of illustrative embodiments, when taken in conjunction with the accompanying drawings depicting the illustrative embodiments.

Figure 1:
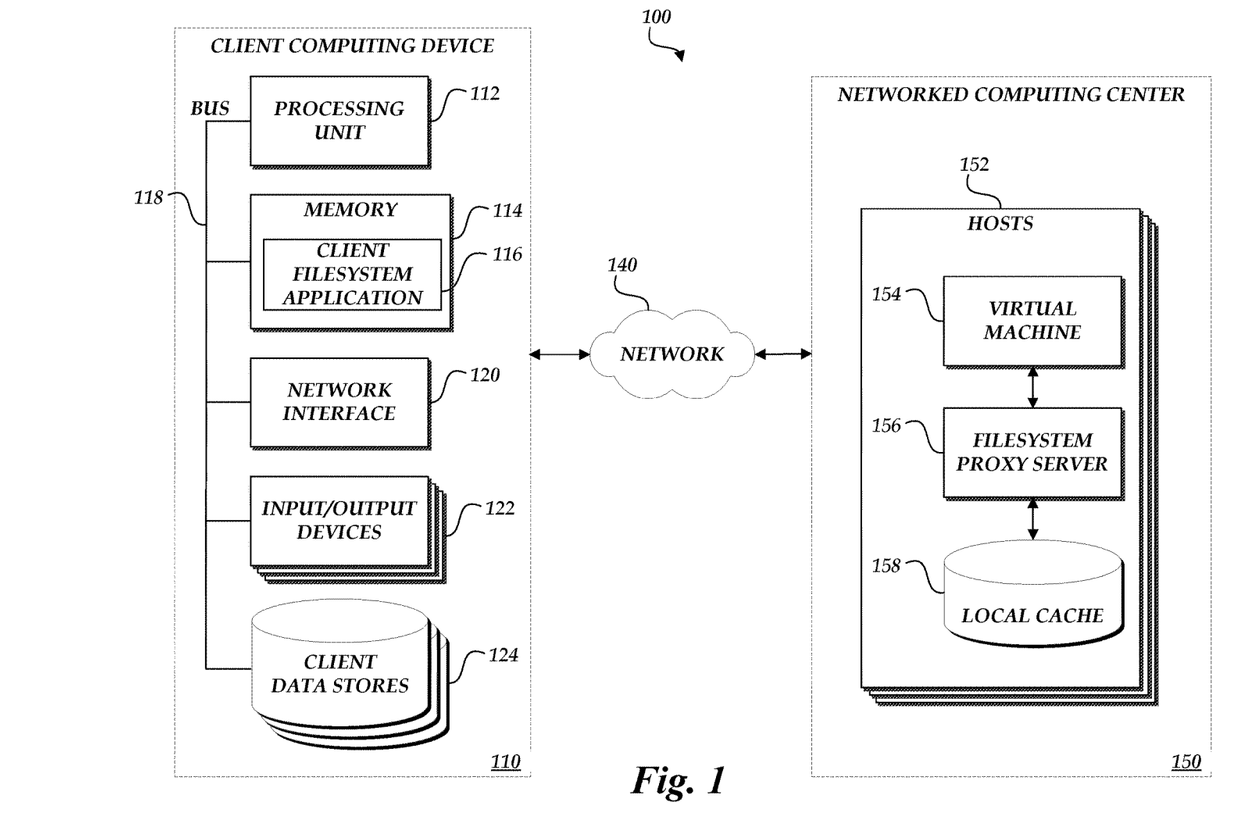
FIG. 1 is a schematic block diagram of an illustrative network topology including a client computing device and a networked computing center interconnected by a network.

FIG. 1 is a block diagram depicting an illustrative network topology 100 including a client computing device 110, which communicates via a network 140 with a virtual machine 154 hosted on a host computing device 152 in a networked computing center 150. Illustratively, the virtual machine 154 communicates with a filesystem proxy server 156 that stores information in a local cache 158.

The client computing device 110 may generally include any computing device that interacts with virtual machine 154. While the term "client" is used in reference to client computing device 110, client computing device 110 should not be construed as limited to an end user computing device. Rather, client computing device 110 may include an end user device, a physical or virtual device owned or operated by the operator of networked computing center 150, or a device owned or operated by another service provider. Examples of a client computing device 110 include, but are not limited to, laptops, personal computers, tablet computers, personal digital assistants (PDAs), hybrid PDA/mobile phones, mobile phones, electronic book readers, digital media players, wearable computing devices, integrated components for inclusion in computing devices, appliances, electronic devices for inclusion in vehicles or machinery, gaming devices, set top boxes, electronic devices for inclusion in televisions, and the like.

The client computing device 110 illustratively includes a number of components utilized to implement aspects of the present disclosure. For example, the client computing device 110 may include a processing unit 112, memory 114, network interface 120, input/output devices 122, and client data stores 124, which are interconnected by a bus 118. The memory 114 may contain executable instructions not depicted in FIG. 1, such as an operating system or an application for interfacing with virtual machines. In the illustrated embodiments, the memory 114 contains a client filesystem application 116. One skilled in the art will understand that aspects of the present disclosure may be implemented using more, fewer, or different combinations of components than those depicted in FIG. 1.

The network topology 100 further includes a network 140 operable to enable communication between the client computing device 110 and the networked computing center 150. The network 140 may be, for instance, a wide area network (WAN), a local area network (LAN), or a global communications network.

In the illustrated embodiment, the networked computing center 150 includes a number of host computing devices 152, which provide computing services to client computing devices including instantiation of a virtual machine 154 on behalf of a user. The virtual machine 154 may be configured with physical or virtual resources such as a processor, memory, network interfaces, input/output devices, data stores, and the like. As illustratively depicted in FIG. 1, the virtual machine 154 may interact with a filesystem proxy server 156, which in turn may store and retrieve resources from a local cache 158. In other embodiments (not depicted in FIG. 1), the filesystem proxy server 156 and local cache 158 may be included in the network topology in various configurations. For example, the filesystem proxy server 156 and local cache 158 may be implemented as executable code and resources within the virtual machine 154. As further examples, the filesystem proxy server 156 and local cache 158 may be implemented on different hosts 152 than the virtual machine 154, or implemented as a separate server or module. One skilled in the art will appreciate that additional filesystem proxy server configurations may also be implemented within the scope of the present disclosure. For example, the local cache 158 may be implemented as a data store or memory of the virtual machine 154. One skilled in the art will further appreciate that the local cache 158 may be significantly larger or smaller than the filesystem it caches, and may store or expire cache entries as needed to utilize the resources available for local caching.

Figure 2:
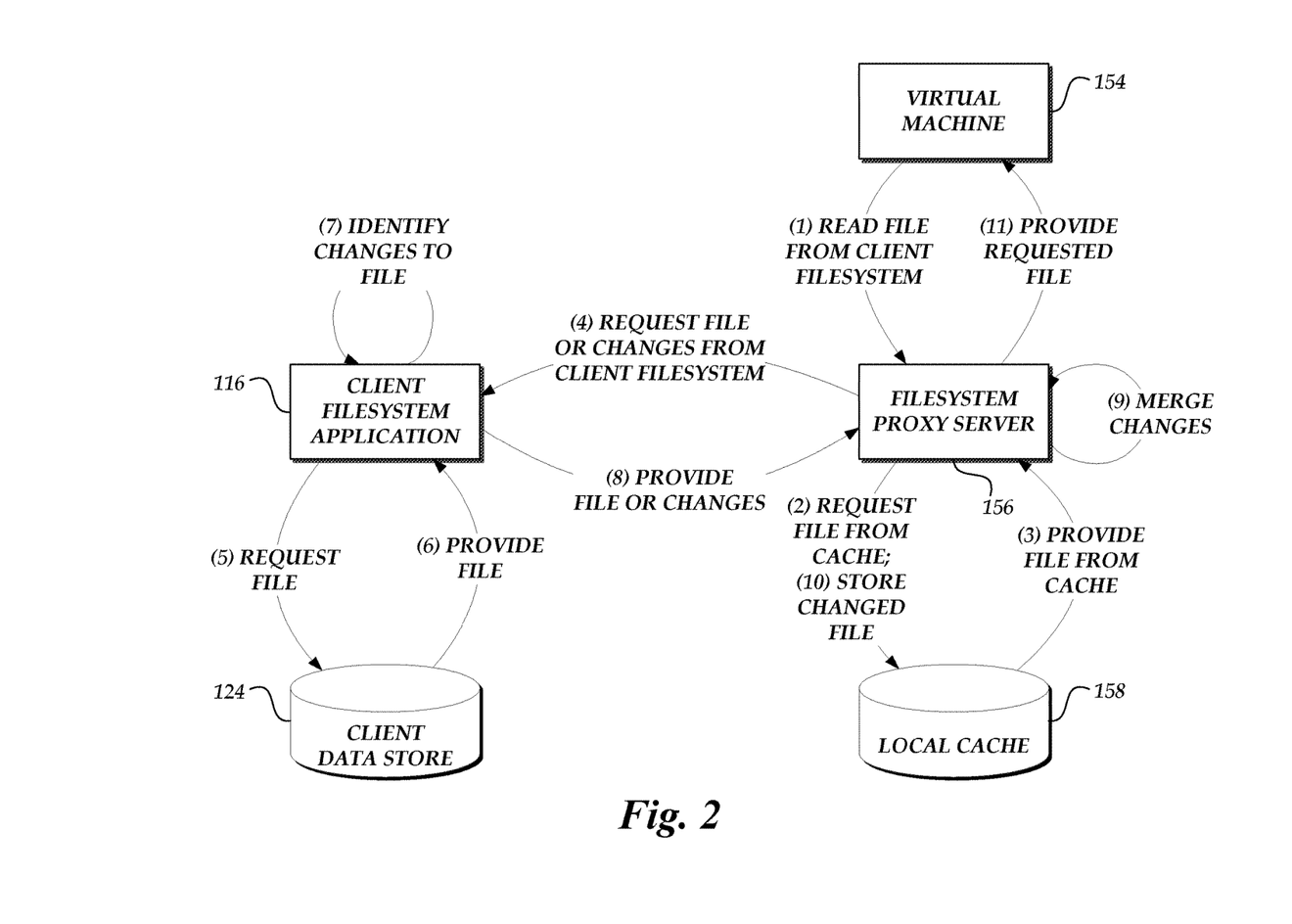
FIG. 2 is an illustrative block diagram depicting retrieval of a file from a proxied filesystem in accordance with aspects of the present disclosure.

With reference now to FIG. 2, illustrative interactions for retrieving a file from a proxied filesystem will be described. The illustrative interactions may be carried out, for example, by the filesystem proxy server 156, client filesystem application 116, and other components within the illustrative network topology of FIG. 1.

At (1), a virtual machine 154 executing on behalf of a user generates a read request to the filesystem proxy server 156. Illustratively, the request may be generated by the user directly, or by a process or application executing on the virtual machine. In various embodiments, as disclosed above, the request may be to access a particular file, retrieve a directory listing, obtain a list of client filesystems available for proxying, or to obtain other resources associated with the client filesystem.

At (2), the filesystem proxy server 156 attempts to fulfill all or part of the request by obtaining resources from the local cache 158, and at (3) the local cache 158 provides any cached resources that are responsive to the request. Illustratively the local cache 158 may have no cached resources that are responsive to the request, cached resources that constitute an incomplete or out-of-date response to the request, or may provide resources that fulfill the request. For example, the local cache 158 may contain a directory listing for the proxied filesystem that was complete at the time it was cached, but excludes files that were later added to the client filesystem.

In some embodiments, described in further detail below, the client filesystem application 116 may independently transmit updates to the filesystem proxy server 156 when it determines that a cached resource has been changed in the client data store 124. In these embodiments, the interactions at (4) through (9) are carried out independently of the request at (1), and the filesystem proxy server 156 may accordingly determine that any resource obtained at (3) is current and complete. Accordingly, in these embodiments, the interaction at (10) may next be carried out and the requested resource provided to the virtual machine 154.

In other embodiments, at (4), the filesystem proxy server 156 issues a request to the client filesystem application 116 to obtain the current resource or the set of changes needed to updated the cached resource. Illustratively, if the local cache 158 does not return any cached resources at (3), then the request at (4) is a request for the resource. If a cached resource is provided at (3), then the request at (4) may be to verify that the cached resource is still current, and if not to provide an updated resource or a set of changes to the cached resource.

At (5), the client filesystem 116 requests the current resource from the client data store 124. In some embodiments, the client filesystem 116 may instead initially request a timestamp, checksum version number, or other identifier for comparison to the corresponding identifier in the request. At (6), the client data store 124 provides the requested resource or the requested information pertaining to the resource.

At (7), the client filesystem application 116 determines whether the cached version of the resource is current, and if not identifies a set of changes that would make the cached version current if applied. In embodiments where the local cache at (3) does not return any cached resources that are responsive to the request, the interaction at (7) may be omitted and the resource obtained at (6) may simply be provided in response to the request at (4). In other embodiments, as described above, the client filesystem application 116 may compare timestamps, checksums, version numbers, or other identifiers to verify whether a cached version of the resource is current. If the client filesystem application 116 verifies that the cached version is current, then at (8) the client filesystem application 116 transmits confirmation to the filesystem proxy server 156 that is has the most current version of the resource.

In embodiments where the client filesystem application 116 determines that the cached version of the resource is not current, the client filesystem application 116 identifies a set of changes. In various embodiments, the client filesystem application 116 may identify the set of changes based on information from a journaling filesystem, from its own journal of detected filesystem changes, or by logging which resources or resource versions were previously transmitted to the filesystem proxy server 156. Further, as described above, the client filesystem application 116 may determine whether to identify and transmit a set of changes or instead transmit the current resource, based on factors such as, for example, the time or the processing power required to identify the set of changes, the size of the file and the available network bandwidth, and so forth.

At (8), the client filesystem application 116 transmits the current resource, or the set of changes needed to make the cached resource current, to the filesystem proxy server 156. At (9), in embodiments where the client filesystem application 116 transmits a set of changes, the filesystem proxy server 156 applies the set of changes to the cached resource to produce an up-to-date version of the resource.

At (10), the filesystem proxy server 156 stores the current version of the resource in the local cache 158. In embodiments where the client filesystem application 116 has confirmed that the existing cached resource is current, this step may be omitted. At (11) the filesystem proxy server 156 provides the requested resource to the virtual machine 154. One skilled in the art will appreciate that the interactions at (10) and (11) may be carried out in either order, and that other variations are within the scope of the present disclosure. For example, as described in more detail above and with reference to FIG. 4, the interactions at (5) through (10) to update a resource in the cache may be carried out prior to and independently of the request for the resource at (1).

Figure 3:
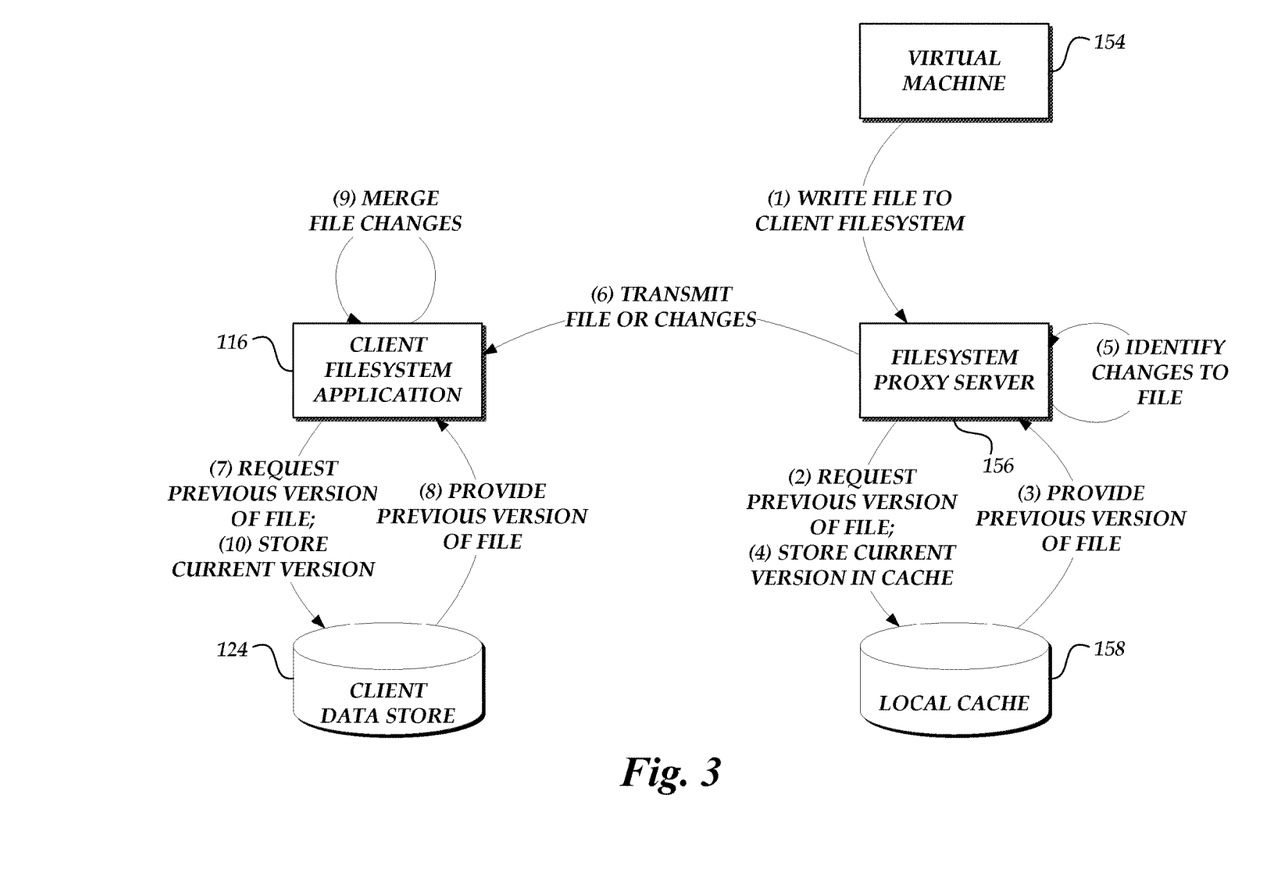
FIG. 3 is an illustrative block diagram depicting writing of a file to a proxied filesystem in accordance with aspects of the present disclosure.

With reference now to FIG. 3, illustrative interactions for writing a file to a proxied filesystem will be described. The illustrative interactions may be carried out, for example, by the filesystem proxy server 156, client filesystem application 116, and other components within the illustrative network topology of FIG. 1.

At (1), a virtual machine 154 executing on behalf of a user generates a write request to the filesystem proxy server 156. Illustratively, the request may be generated by the user directly, or by a process or application executing on the virtual machine. In various embodiments, the write request may be to replace an existing file to the proxied filesystem, or to write an entirely new file to the proxied filesystem. The write request may further update, or cause to be updated, information associated with the proxied filesystem such as directory listings, file version numbers, timestamps, or other information.

At (2), the filesystem proxy server 156 attempts to retrieve a previous version of the file associated with the write request from the local cache 158. At (3), in embodiments where the local cache 158 has stored a previous version, the local cache 158 returns the previous version of the file. At (4), the filesystem proxy server 156 stores the associated file in the local cache 158. In some embodiments, storing the new version of the file in the local cache overwrites the previous version of the file or causes the previous version to expire from the cache. In other embodiments, the local cache 158 may implement journaling, versioning, or other techniques to allow subsequent retrieval of the previous version.

At (5), the filesystem proxy server 156 identifies a set of changes that, if applied to the previous version of the file, produce the current version of the file. As described above, the set of changes may be identified as a series of edit operations. If no previous version of the file is provided at (3), the interaction at (5) may be omitted. Further, as described above with regard to the client filesystem application 116, the filesystem proxy server 156 may determine whether to send a set of changes or the file itself based on criteria such as time, available bandwidth, or processing power required to determine the set of changes.

One skilled in the art will understand that aspects of the present disclosure include several variations on the interactions at (2), (3), (4), and (5). For example, the filesystem proxy server 156 may identify and store a set of changes in the local cache 158, and retain the previous version of the file in the cache. As a further example, the interactions at (4) may be carried out in parallel with or prior to the interactions at (2), (3), and (5) in embodiments where current and previous versions of the file coexist in the local cache 158. The interactions disclosed herein are thus understood to be illustrative and not limiting.

At (6), the filesystem proxy server 156 transmits the set of changes to the client filesystem application 116. In embodiments where no previous version of the file was stored in the local cache 158, the filesystem proxy server 156 transmits the file itself. As described above, the interaction between the filesystem proxy server 156 and the client filesystem application 116 may utilize a standard protocol/interface, such as WebDAV or FTP, or may utilize a proprietary protocol, such as a protocol designed to communicate file changes.

At (7), the client filesystem application 116 requests the previous version of the file from the client data store 124, and at (8) the client data store 124 provides the previous version. At (9), the client filesystem application 116 applies the set of changes to the previous version of the file to obtain the current version of the file. In embodiments where the filesystem proxy server 156 transmits the current file rather than a set of changes, the interactions at (7), (8), and (9) may be omitted. At (10), the client filesystem application 116 stores the current version of the file in the client data store 124.

In various embodiments not illustrated in FIG. 3, the filesystem proxy server 156 may carry out further interactions in accordance with the present disclosure when writing a file to the proxied filesystem. For example, the filesystem proxy server 156 may carry out interactions illustrated in FIG. 2 to determine whether a version of the file in the local cache 158 is consistent with the version stored in the client data store 124. The filesystem proxy server 156 may then obtain and apply a set of changes from the client filesystem application 116 to update the local cache 158 before storing the current version and identifying changes, or may cause expiry of the outdated version in the local cache 158, store the new version in the local cache 158, and then transmit the latest version of the file to the client filesystem application 116.

Figure 4:
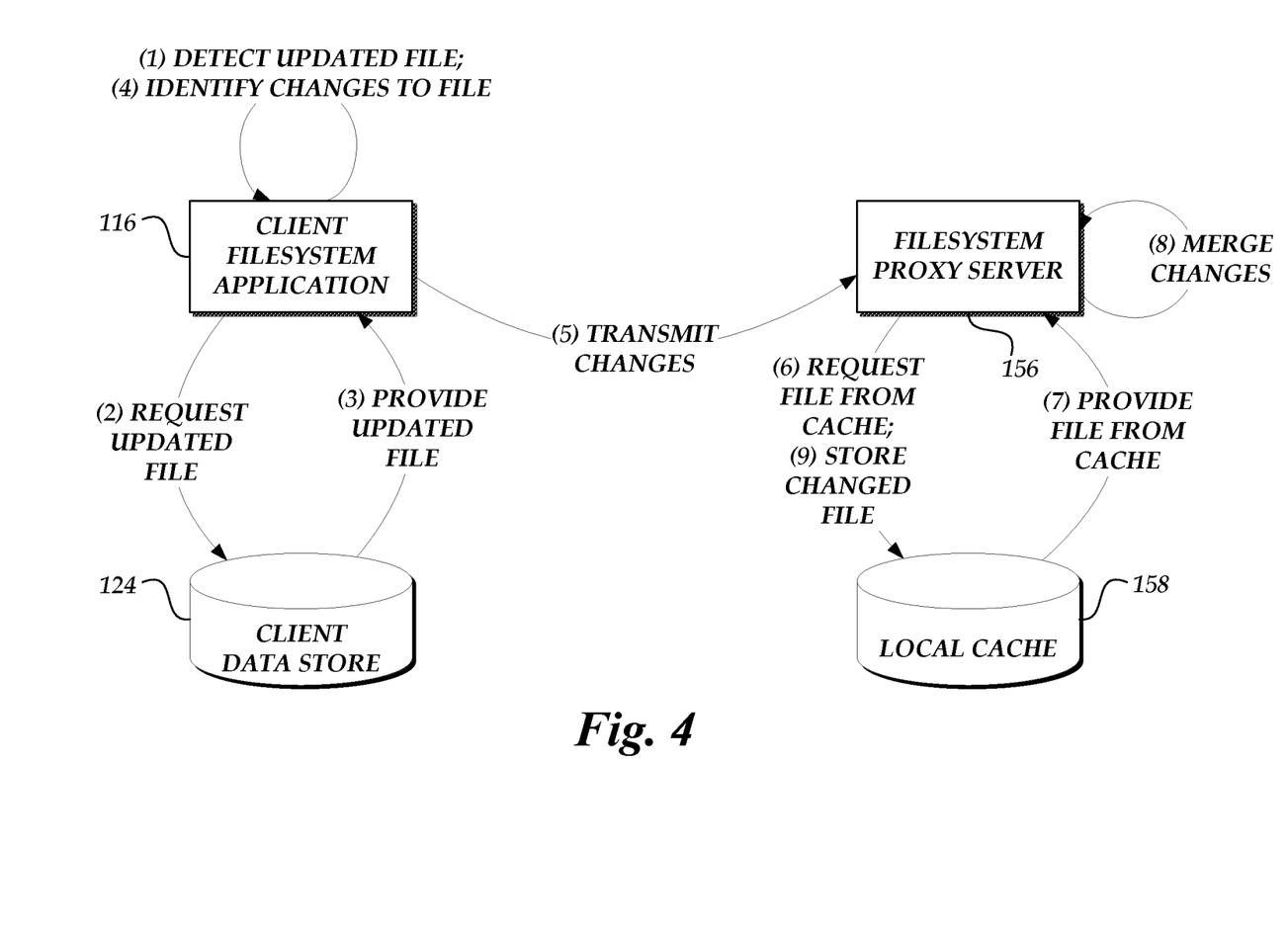
FIG. 4 is an illustrative block diagram depicting monitoring of a proxied filesystem and propagation of filesystem updates in accordance with aspects of the present disclosure.

Turning now to FIG. 4, illustrative interactions for monitoring a client filesystem and updating the locally cached versions of files and other information will be described. The illustrative interactions may be carried out, for example, by the filesystem proxy server 156, client filesystem application 116, and other components within the illustrative network topology of FIG. 1. As described above, the interactions illustrated in FIG. 4 may be carried out in parallel with and independently from the interactions depicted in FIGS. 2 and 3.

At (1), the client filesystem application 116 detects a change to the client filesystem. Illustratively, the client filesystem application 116 may monitor the client filesystem using functionality provided by an operating system on the client computing device 110, journaling or other capabilities provided by the client filesystem, by maintaining its own journal of changes, by determining the client filesystem state periodically or in response to events, or by other techniques.

At (2), the client filesystem application requests a copy of an updated filesystem resource from the client data store 124, and at (3) the client data store 124 provides a copy of the updated file or resource. As previously described, the updated resource may be a file, information regarding files such as timestamps or a directory listing, or other filesystem resources.

At (4), the client filesystem application 116 identifies a set of changes between the updated resource and a previously transmitted version of the resource. In a preferred embodiment, the client filesystem application 116 only monitors resources that have previously been transmitted to the filesystem proxy server 156, and does not transmit resources or changes that have not been requested by the filesystem proxy server 156. In alternative embodiments, the client filesystem application 116 monitors all or part of the client filesystem regardless of which resources have been previously transmitted, but only identifies and transmits changes for resources that have been previously transmitted. The client filesystem application 116 may maintain its own log of resources that have previously been transmitted, or may access a journaling filesystem, operating system log, or other repository to obtain a previous version of the resource for comparison to the current version. As described above, the identified set of changes may be a list of edit operations that produce the current version when applied to the previous version.

At (5), the client filesystem application 116 transmits the set of changes to the filesystem proxy server 156. In some embodiments, as described above, the client filesystem application 116 may determine that the interaction at (4) should be omitted and the updated file itself transmitted at (5). For example, the client filesystem application 116 may determine that carrying out the interaction at (4) will exceed a predefined threshold for time, processor utilization, battery consumption, or consumption of other resources. As a further example, the client filesystem application 116 may determine based on the file size, available bandwidth, scope of changes, and other factors that the entire file will be transmitted rather than the set of changes.

At (6), the filesystem proxy server receives the set of changes to the resource and requests the cached version of the resource from the local cache 158. At (7), the local cache 158 provides the cached version. Thereafter, at (8), the filesystem proxy server 156 applies the set of changes to the cached version of the resource to produce the current version of the resource. In embodiments where the client filesystem application 116 transmits the current resource rather than a set of changes, the interactions at (6), (7), and (8) may be omitted.

At (9), the filesystem proxy server 156 stores the current version of the file in the local cache 158. One skilled in the art will appreciate that several variations of the embodiments depicted in FIG. 4 are within the scope of the present disclosure. For example, the filesystem proxy server 156 may store the set of changes in the local cache 158 and defer production of a current version until that version is actually requested. In some embodiments the filesystem proxy server 156 may store multiple sets of changes and apply them in a sequential order when a current version of the resource is requested. As a further example, as described above with reference to FIG. 2, the interactions at (2) through (9) may be carried out in response to a request for a current version of the resource. The embodiments described and depicted in FIG. 4 are thus understood to be illustrative rather than limiting.

Figure 5:
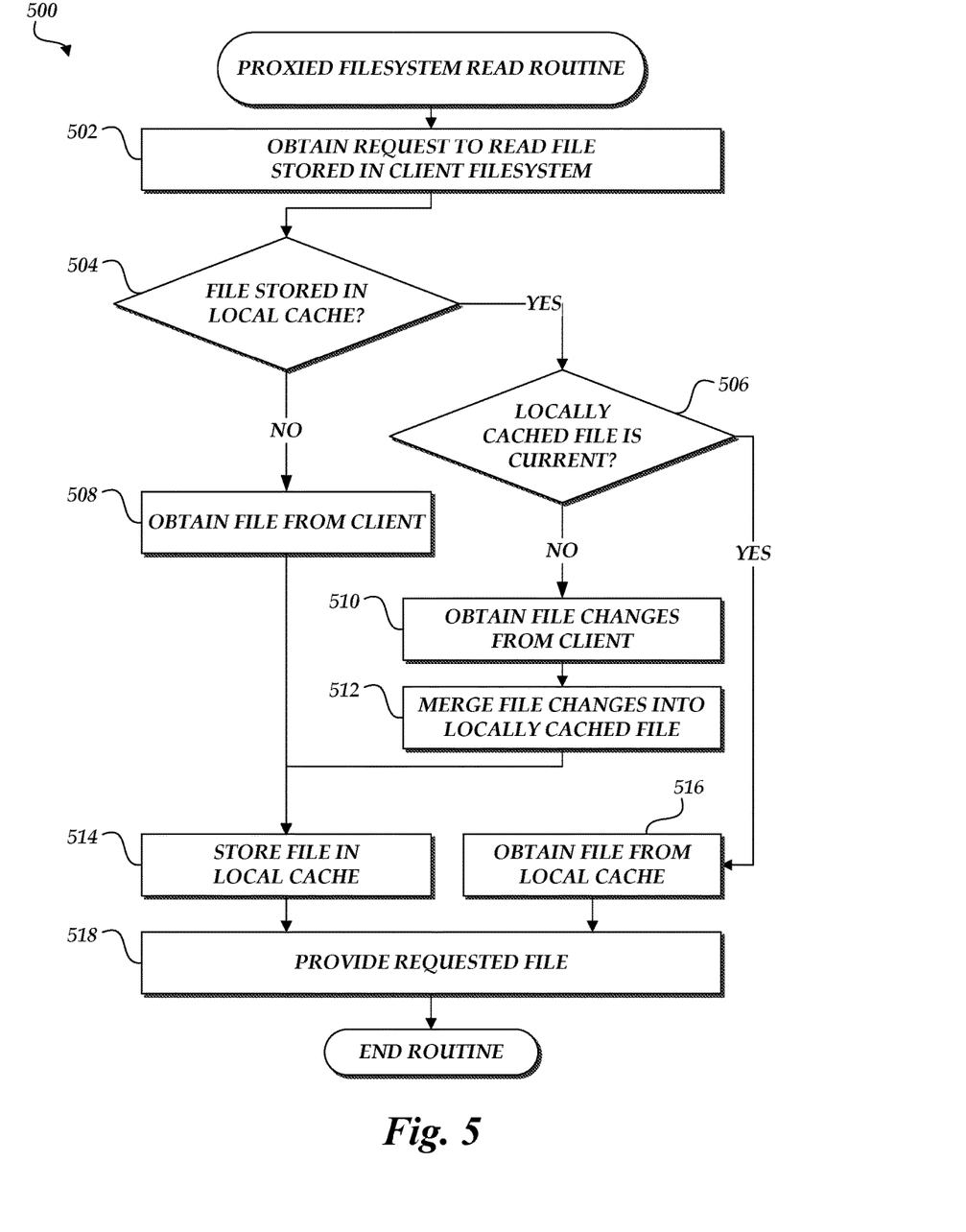
FIG. 5 is a flow diagram depicting an illustrative proxied filesystem read routine in accordance with aspects of the present disclosure.

FIG. 5 is a flow diagram of an illustrative routine 500 for processing requests to read information from a proxied filesystem. The routine 500 may be carried out, for example, by the filesystem proxy server 156 of FIG. 1. In some embodiments, blocks of the routine 500 may be carried out by other components, such as the client filesystem application 116.

At block 502, a request to read a file or other resource stored in the client filesystem may be obtained. Illustratively, the request may be received from the virtual machine 154 of FIG. 1, and may be generated by user interaction with the virtual machine 154 or by standalone operation of the virtual machine 154. The request may specify a file or files to be read, information such as a directory listing to be obtained, a search to be performed, or other operations that require the retrieval of information from the client filesystem.

At decision block 504, a determination is made as to whether a resource stored in a local cache, such as the local cache 158 of FIG. 1, can be used to partially or fully satisfy the read request. Illustratively, the local cache 158 may contain a copy of the requested resource, and the copy may be current or outdated. The determination at decision block 504 assesses whether the local cache 158 contains any relevant information responsive to the read request. If the determination is that the local cache 158 does not contain any relevant information, then at block 508 a file or other resource responsive to the request may be obtained. Illustratively, the responsive file or resource may be obtained from an application executing on a client computing device, such as the client filesystem application 116 of FIG. 1.

If however the determination at decision block 504 is that the local cache 158 contains relevant information, then at decision block 506 a determination is made as to whether the relevant information is current. In some embodiments, as described above, the determination may be made by comparing a version number, timestamp, checksum, or other identifier of the cached information to a corresponding identifier on the client computing device. For example, the routine 500 may determine that a file stored in the local cache 158 has a timestamp indicating that the file was last edited on Dec. 2, 2015 at 10:33 a.m. The routine 500 may obtain a timestamp for the same file stored in the client filesystem on the client computing device 110, and the latter timestamp may indicate that the file on the client filesystem was last edited on Dec. 4, 2015 at 3:20 p.m. By comparing the timestamps, the routine 500 may determine that the cached copy of the file is no longer current. In some embodiments, the routine 500 may transmit, or cause to be transmitted, the timestamp or other identifier of the locally cached file, and may receive either confirmation that the locally cached file is current or a set of changes to make the locally cached file current, as described below.

If the determination is made that the cached resource is not current, then at block 510 a set of changes may be obtained. Illustratively, as described above, the set of changes may be generated by comparing the current version of the resource to the cached version of the resource. A set of changes may then be generated to transform the cached version of the resource into the current version. In some embodiments, as described above, a determination may be made based on time, processing resources, bandwidth, file size, or other factors to obtain a complete copy of the requested resource rather than a set of changes. At block 512, in embodiments where a set of changes is obtained, the set of changes is applied to the cached version of the resource to create a current copy of the resource. After a current copy of the resource is obtained at block 508 or block 512, at block 514 the current copy may be stored in the local cache 158 for later retrieval. In some embodiments, as described above, the current version of the resource may coexist with the earlier version in the cache, or the set of changes may be stored along with the earlier version. In other embodiments, storing the current copy may cause the previous copy to be expired or deleted from the local cache 158. Thereafter, at block 518, the requested file is provided in response to the request.

If instead a determination is made at block 506 that the locally cached version of the resource is a current version, then at block 516 the locally cached version of the resource is obtained from the local cache 158. Thereafter, at block 518, the requested file is provided in response to the request.

Figure 6:
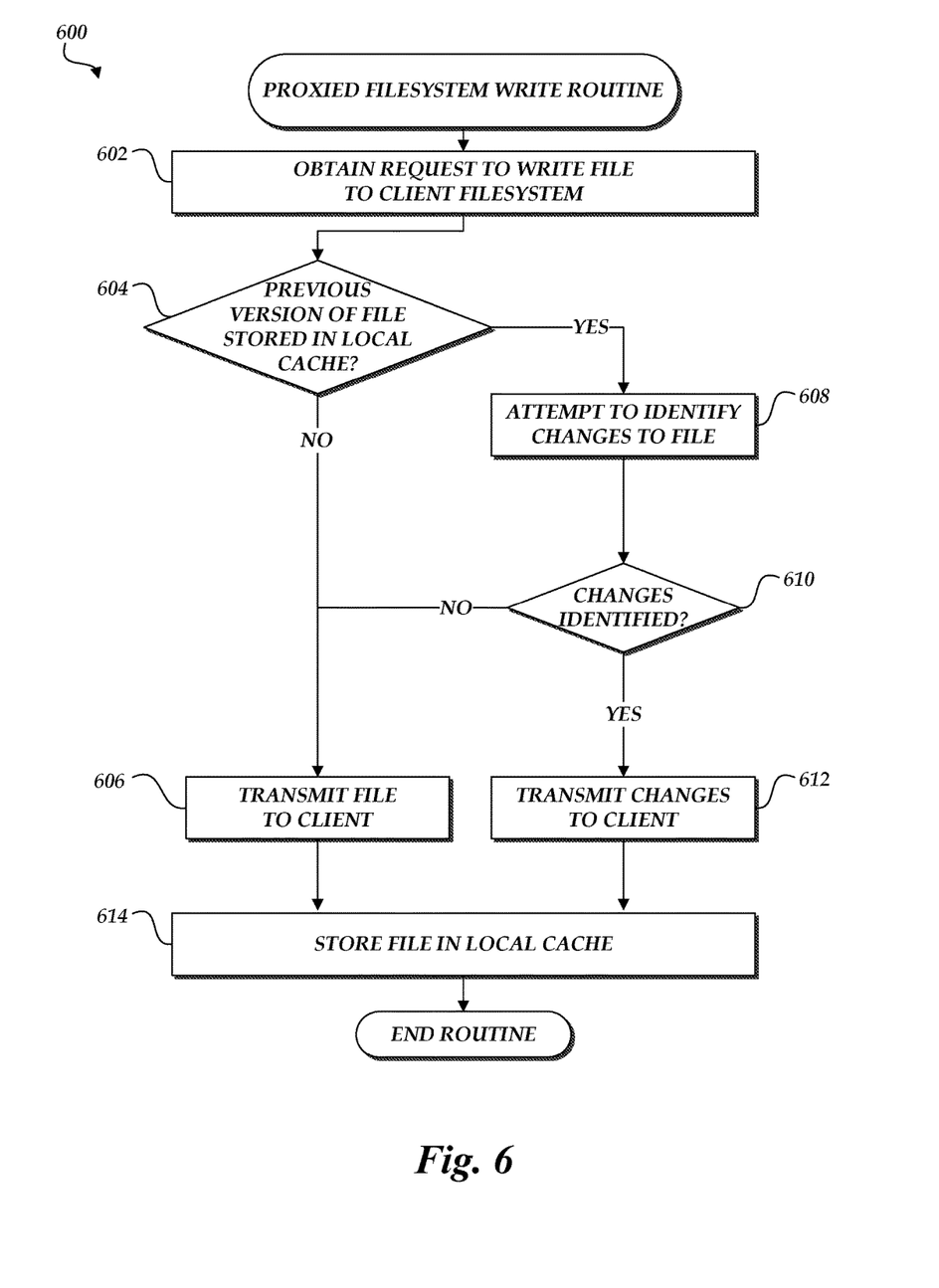
FIG. 6 is a flow diagram depicting an illustrative proxied filesystem write routine in accordance with aspects of the present disclosure.

With reference now to FIG. 6, an illustrative routine 600 for processing requests to write to a proxied filesystem will be described. The routine 600 may illustratively be carried out by the filesystem proxy server 156 of FIG. 1.

At block 602, a request to write information to the proxied filesystem may be obtained. Illustratively, the request may include or make reference to a file to be written to the proxied filesystem. For example, the request may indicate that a file stored in a different filesystem should be copied and stored to the proxied filesystem, that data in the memory of the virtual machine be written to a new data file in the proxied filesystem, or that an existing file in the proxied filesystem be updated with new information.

At decision block 604, a determination is made as to whether a previous version of the referenced file is stored in a local cache, such as the local cache 158. In embodiments where the request is to write a new file to the proxied filesystem, decision block 604 may be omitted and the routine 600 may proceed directly to block 606. The routine 600 also proceeds to block 606 if the determination is that no previous version of the file is stored in the local cache 158.

At block 606, the file associated with the write request is transmitted to the client computing device 110 associated with the client filesystem. Illustratively, the file or other information may be received and processed by an application executing on the client computing device 110, such as the client filesystem application 116 of FIG. 1. At block 614, the file is stored in the local cache 158. Thereafter, the routine ends.

If instead the determination is made at block 604 that a previous version of the file is stored in the local cache 158, then the routine 600 branches to block 608, where a set of changes between the new version of the file and the previous version may be identified. Illustratively, as described above, a binary 'diff' or other comparison may be performed to identify a set of changes that will transform the previous version of the file into the new version. In some embodiments, a determination may be made as to whether a set of changes has been identified, or as to whether the identified set of changes should be transmitted. Illustratively, the attempt at block 608 may be halted by the routine 600 if identifying the set of changes takes longer than a predetermined time interval, if the set of changes exceeds a particular size or a percentage of the file size, if identifying the set of changes consumes more than a specified amount of available processing power or memory, or due to other factors. At decision block 610, a determination may be made as to whether a set of changes has been identified. If the determination is that a set of changes has not been identified, or that the set of changes will not be transmitted, then the routine 600 branches to block 606.

If the determination is that the set of changes has been identified and is suitable for transmission, then at block 612 the set of changes to the previous version may be transmitted to the client computing device 110 associated with the client filesystem, and at block 614 the new version of the file may be stored in the local cache 158. In some embodiments, as described above, the set of changes may be stored in the local cache 158 together with the previous version of the file. In other embodiments, the previous version of the file may be deleted or expired from the local cache 158 when the new version is stored, or the new and previous versions of the file may coexist in the local cache 158. Thereafter, the routine ends.

One skilled in the art will appreciate that the blocks of routine 600 may be carried out in various orders within the scope of the present disclosure. For example, blocks 606 and 612 may be carried out in any order, as may blocks 610 and 612. As a further example, in some embodiments, block 612 may be carried out prior to or in parallel with blocks 604 and 608. The depiction of routine 600 in FIG. 6 is thus understood to be illustrative and not limiting.

Figure 7A:
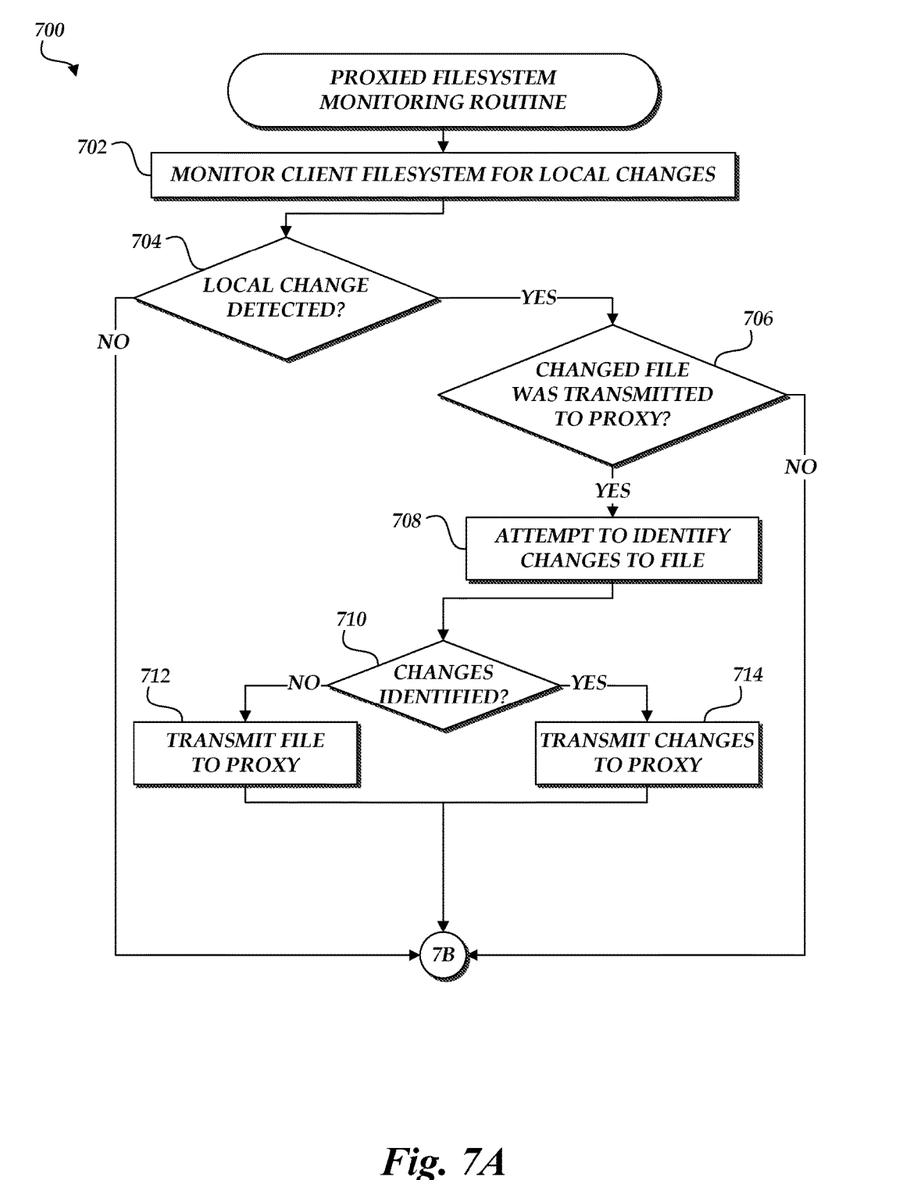
FIGS. 7A and 7B are flow diagrams depicting an illustrative proxied filesystem monitoring routine in accordance with aspects of the present disclosure.
Figure 7B:
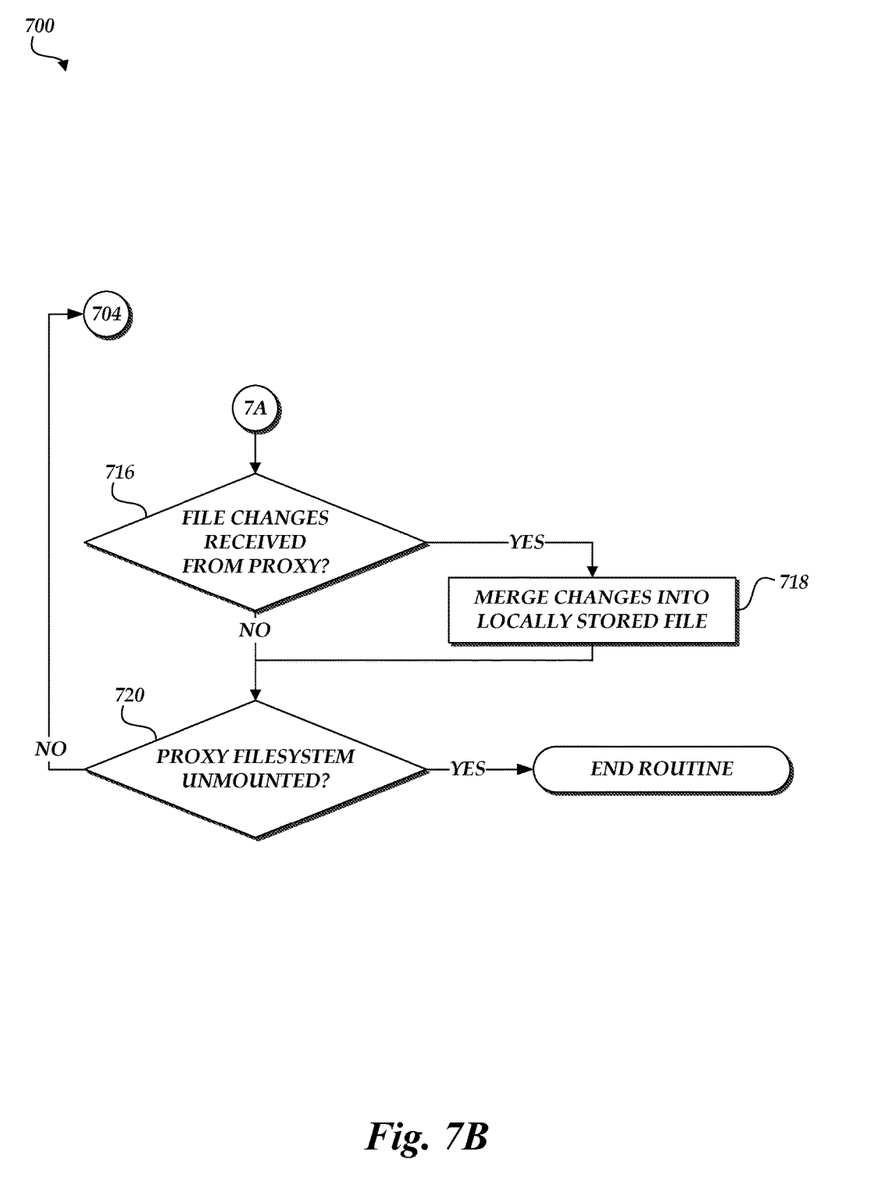

With reference now to FIGS. 7A and 7B, an illustrative routine 700 for monitoring and generating updates to a proxied filesystem will be described. The illustrative routine 700 may be carried out, for example, by the client filesystem application 116 of FIG. 1. Turning now to FIG. 7A, at block 702, a client filesystem may be monitored to identify locally generated changes to resources. In various embodiments, as described above, the client filesystem may be monitored by detecting writes to the filesystem, detecting events related to the filesystem, periodically scanning the filesystem, accessing or maintaining a journal, or otherwise detecting that filesystem resources have been modified.

At decision block 704, a determination is made as to whether there has been a change to the client filesystem. For purposes of illustration a change to a file is depicted in FIG. 7A, although aspects of the present disclosure include various changes to the filesystem. If a change is detected, the routine 700 branches to decision block 706, where a determination is made as to whether the changed file had previously been transmitted to a proxy server, such as the filesystem proxy server 156 of FIG. 1.

If the determination at decision block 706 is that the changed file had previously been transmitted to a proxy server, then at block 708 the routine 700 may attempt to identify a set of changes. As described above, the set of changes may be a set of edit operations that, when applied to the previously transmitted version of the file. In some embodiments, as described above with reference to FIG. 6, the attempt to identify a set of changes may be halted if it exceeds a time limit, size limit, bandwidth limit, or due to other factors.

At decision block 710, a determination may be made as to whether a set of changes has been identified. In some embodiments, the determination may further assess whether to transmit the identified set of changes. Illustratively, a determination may be made that transmitting the current file would consume fewer resources (in terms of bandwidth, processing power, and so forth) relative to transmitting the set of changes. If the determination is that a set of changes will be transmitted, then at block 714 the set of changes may be transmitted to the proxy server. If not, then at block 712 the changed file is instead transmitted to the proxy server.

If no change is detected at decision block 704, if the determination at block 706 is that the changed file had not previously been transmitted to the proxy server, or after transmission of a file at block 712 or transmission of a set of changes at block 714, the routine 700 continues at decision block 716.

With reference now to FIG. 7B, at decision block 716, a determination may be made as to whether a set of changes has been received from the filesystem proxy server 156. If a set of changes has been received, then at block 718 the changes may be applied to the local version of the file or other resource that has been changed, and the resulting updated file may be stored in the client filesystem. In some embodiments, as described above, a determination may instead be made that the updated file or resource itself has been received from the proxy server, in which case the routine 700 may store the file or resource in the client filesystem.

At decision block 720, a determination may be made as to whether the proxy server has ceased to proxy the client filesystem. Illustratively, the determination at decision block 702 may be that the proxy filesystem has been unmounted, operation of the virtual machine has terminated, or that other conditions exist and indicate that monitoring of the client filesystem is no longer required. If so, the routine 700 terminates. If instead the determination is that monitoring of the client filesystem should continue, then the routine 700 continues at decision block 704.

One skilled in the art will appreciate that several variations on the illustrated routine 700 are within the scope of the present disclosure. For example, decision block 716 may be carried out prior to, or in parallel with, decision block 704. As a further example, the monitoring of the client filesystem at block 702 may be limited to monitoring only those files or resources that have previously been transmitted to the proxy server, and the determination at decision block 706 may thus be omitted. Further, in some embodiments, routine 700 may identify and resolve conflicting updates to the client filesystem. For example, the routine 700 may identify a local change to a file in the client filesystem and, in parallel, receive a set of updates from the proxy server to the same file. The embodiment of the routine depicted in FIGS. 7A and 7B is thus understood to be illustrative and not limiting.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y, and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
a local data store configured to store cached data files and specific computer-executable instructions; and
a computing device including a processor in communication with the local data store, wherein the specific computer-executable instructions, when executed by the processor, configure the processor to at least:
obtain, from a client filesystem, client filesystem information;
cache the client filesystem information in the local data store;
cause transmission of the client filesystem information to a virtual machine executing on behalf of a client;
obtain, from the virtual machine, a request for a client data file, wherein the client data file is represented in the client filesystem information;
determine that a cached data file stored in the local data store is associated with the client data file;
determine a cached file version identifier based at least in part on the cached data file;
cause transmission of the cached file version identifier to a client filesystem application executing on a client computing device associated with the client filesystem, wherein the client filesystem application identifies, based at least in part on the cached file version identifier, one or more changes made to the client data file;
obtain, from the client filesystem application, the one or more changes;
apply the one or more changes to the cached data file to form a current data file;
store the current data file in the local data store; and
cause transmission of the current data file to the virtual machine.

2. The system of claim 1, wherein the one or more changes comprise one or more edit operations.

3. The system of claim 2, wherein apply the one or more changes to the cached data file, the processor is configured to apply the one or more edit operations to the cached data file.

4. The system of claim 1, wherein the processor is further configured to at least:
prior to causing transmission of the client filesystem information to a virtual machine executing on behalf of a client,
determine a cached information version based at least in part on the cached filesystem information;
cause transmission of the cached information version to the client filesystem application executing on the client computing device;
determine that the cached information version does not correspond to a current filesystem information version; and
update the cached filesystem information with current filesystem information.

5. The system of claim 4, wherein the client filesystem information comprises directory information.

6. A computer-implemented method comprising:
obtaining, by a filesystem proxy, remote filesystem information from a remote filesystem;
caching, by the filesystem proxy, the remote filesystem information in a filesystem cache;
transmitting, by the filesystem proxy to a virtual machine, the remote filesystem information;
obtaining, by the filesystem proxy, a first request from the virtual machine, the first request including at least a first requested resource, wherein the first requested resource is represented in the remote filesystem information;
determining, by the filesystem proxy, that a first cached resource in the filesystem cache corresponds to the first requested resource;
determining, by the filesystem proxy, an identifier corresponding to the first cached resource;
transmitting, by the filesystem proxy to the remote filesystem, the identifier corresponding to the first cached resource, wherein the remote filesystem identifies, based at least in part on the identifier corresponding to the first cached resource, a first set of changes made to the first requested resource;
obtaining, by the filesystem proxy from the remote filesystem, the first set of changes;
applying, by the filesystem proxy, the first set of changes to the first cached resource to form a first current resource; and
transmitting, by the filesystem proxy, the first current resource to the virtual machine in response to the first request.

7. The computer-implemented method of claim 6, wherein the identifier corresponding to the first cached resource comprises at least one of a version number, timestamp, checksum, or hash value.

8. The computer-implemented method of claim 6, wherein the set of changes comprises one or more edit operations applicable to the first cached resource.

9. The computer-implemented method of claim 6 further comprising:
storing, by the filesystem proxy, the first current resource in the filesystem cache.

10. The computer-implemented method of claim 6 further comprising:
obtaining, by the filesystem proxy, a second request from the virtual machine, the second request including at least a second requested resource;
determining, by the filesystem proxy, that no cached resource in the filesystem cache corresponds to the second requested resource;
obtaining, by the filesystem proxy, the second requested resource from the remote filesystem; and
transmitting, by the filesystem proxy, the second requested resource to the virtual machine, in response to the second request.

11. The computer-implemented method of claim 10 further comprising:
storing, by the filesystem proxy, the second requested resource in the filesystem cache.

12. The computer-implemented method of claim 6 further comprising:
- obtaining, by the filesystem proxy, a second request from the virtual machine, the second request including a second requested resource;
- determining, by the filesystem proxy, that a second cached resource in the filesystem cache corresponds to the second requested resource;
- determining, by the filesystem proxy, an identifier corresponding to the second cached resource;
- transmitting, by the filesystem proxy to the remote filesystem, the identifier corresponding to the second cached resource;
- obtaining, by the filesystem proxy, the second requested resource from the remote filesystem;
- storing, by the filesystem proxy, the second requested resource in the filesystem cache; and
- transmitting, by the filesystem proxy, the second requested resource to the virtual machine in response to the second request.

13. The computer-implemented method of claim 6 further comprising:
- obtaining, by the filesystem proxy, a second request the virtual machine, the second request including at least a second requested resource;
- determining, by the filesystem proxy, that a second cached resource in the filesystem cache corresponds to the second requested resource;
- determining, by the filesystem proxy, that the second cached resource is current; and
- transmitting, by the filesystem proxy, the second cached resource to the virtual machine in response to the second request.

14. The computer-implemented method of claim 13, wherein determining that the second cached resource is current comprises:
- determining, by the filesystem proxy, an identifier corresponding to the second cached resource;
- transmitting, by the filesystem proxy, the identifier corresponding to the second cached resource to the remote filesystem; and
- obtaining, by the filesystem proxy, an indication from the remote filesystem that the second cache resource is current.

15. The computer-implemented method of claim 6 further comprising:
- obtaining, by the filesystem proxy, a second request from the virtual machine, the second request including a second requested resource associated with a second cached resource in the filesystem cache;
- obtaining, by the filesystem proxy, from the remote filesystem, a second set of changes made to the second requested resource associated with the second cached resource;
- applying, by the filesystem proxy, the second set of changes to the second cached resource to form a second current resource; and
- storing, by the filesystem proxy, the second current resource in the filesystem cache.

16. A non-transitory computer-readable medium comprising computer-executable instructions that when executed by a first computing device comprising a processor and a memory cause the first computing device to at least:
- obtain, from a filesystem application, filesystem information associated with a remote filesystem monitored by the filesystem application;
- cache the filesystem information in a data store configured to store cached resources;
- transmit the filesystem information;
- obtain a request for a resource represented in the filesystem information;
- determine that a cached resource in the data store is associated with the resource specified in the request;
- cause the filesystem application to identify a set of changes made to the resource specified in the request, the set of changes determined based at least in part on an identifier associated with the cached resource;
- obtain, from the filesystem application, the set of changes made to the resource identified in the request;
- apply the set of changes to the cached resource to form a current resource; and
- transmit the current resource in response to the request.

17. The non-transitory computer-readable medium of claim 16, wherein the computer-executable instructions further cause the first computing device to at least cache the current resource in the data store.

18. The non-transitory computer-readable medium of claim 16, wherein the request is a write request, and wherein the computer-executable instructions further cause the first computing device to at least cause transmission of at least one of the set of changes or the current resource to a second computing device associated with the filesystem application.

19. The non-transitory computer-readable medium of claim 16, wherein the computer-executable instructions further cause the first computing device to at least:
- determine that the set of changes exceeds a threshold; and
- responsive to determining that the set of changes exceeds a threshold, cause transmission of the current resource to a second computing device associated with the filesystem application.

20. The non-transitory computer-readable medium of claim 19, wherein to determine that the set of changes exceeds a threshold the computer-executable instructions cause the first computing device to at least determine that a duration required to obtain the set of changes exceeds the threshold.

21. The non-transitory computer-readable medium of claim 19, wherein the threshold is a size threshold, and wherein computer-executable instructions further cause the first computing device to at least determine the threshold based at least in part on a size of the current resource.

* * * * *